UNITED STATES PATENT OFFICE.

JULES VILLE, OF MONTPELLIER, FRANCE.

RED DYE.

SPECIFICATION forming part of Letters Patent No. 589,766, dated September 7, 1897.

Application filed February 10, 1897. Serial No. 622,856. (Specimens.) Patented in France July 17, 1896, No. 258,144.

*To all whom it may concern:*

Be it known that I, JULES VILLE, of Montpellier, France, have invented certain new and useful Improvements in Coloring-Matters of the Triphenylmethane Series, which are fully described in the following specification, and which have been patented in France by Patent No. 258,144, dated July 17, 1896.

This invention relates to new red coloring-matters of the triphenylmethane group and to the method of producing the same.

Anilin reacts on rosolic acid, producing a blue coloring substance, azulin, the constitution of which is imperfectly known.

I have caused different diamins to act on rosolic acid—such as para and metaphenylene diamins, para and metacresylene diamins—and have thus obtained blue coloring-matters. Then I substituted for aromatic amins hydrazins of the same group and obtained in this manner coloring substances of great commercial value, especially when using phenylhydrazin.

These coloring-matters are obtained by heating for, say, twelve hours, in an ascending refrigerating vessel.

First. Three molecules of phenylhydrazin and one molecule of rosolic acid, or, second, two molecules of phenylhydrazin and one molecule of rosolic acid in the presence of alcohol, or, third, one molecule of phenylhydrazin and one molecule of rosolic acid in the presence of alcohol.

In the second case it is preferable to remove the alcohol before the end of the operation, and to continue to heat the rosolic acid and phenylhydrazin alone.

The coloring-matters when removed appear as a red-brown mass, which is crushed before being made use of.

The completed product is a pulverulent mass varying in shade from yellow red to red brown, having a brilliant reflection. It dissolves in alcohol and acetic acid, forming solutions of red color; in concentrated hydrochloric and sulfuric acids, forming solutions of yellow color. By dilution with water these solutions become bright red. The acid solutions are precipitated by alkalies and the precipitate is red. These products dye animal fibers directly.

For use these coloring-matters are to be dissolved in concentrated acetic acid and then poured into the dyeing-bath. Sodium aluminate is then added until the bath is only very slightly acid.

By this process, consisting in heating for about twelve hours aromatic hydrazins with rosolic acid, the vapors evolved during the operation being condensed in the apparatus and the operation taking place in the presence of the alcohol or without, the new red coloring-matters are obtained, the proportion of aromatic hydrazins and rosolic acid varying according to the shade of the dyestuff to be obtained.

Having now particularly described and ascertained the nature of my said invention and in what manner the same is to be performed, I declare that what I claim is—

1. The process of producing red coloring-matters consisting in heating aromatic hydrazins with rosolic acid, the vapors evolved during the operation being condensed, and the proportion of aromatic hydrazins and rosolic acid varying in accordance with the depth of color desired, substantially as described.

2. The process of producing red coloring-matters by heating an aromatic hydrazin with rosolic acid in the presence of alcohol, substantially as described.

3. The process of producing red coloring-matters by heating phenylhydrazin with rosolic acid, substantially as described.

4. The described coloring-matters produced by heating an aromatic hydrazin with rosolic acid, said product being of a reddish color, soluble in alcohol and acetic acid, forming red solutions, and in concentrated hydrochloric and sulfuric acids forming yellow solutions, and being distinguished by the other characteristics hereinbefore set forth.

In testimony whereof I have signed this specification in the presence of two subscribing witnesses.

JULES VILLE.

Witnesses:
ARTELT,
HANIEL.